United States Patent [19]

Amberg et al.

[11] 4,314,799
[45] Feb. 9, 1982

[54] COMPRESSION MOLDING MACHINE FOR ORGANIC THERMOPLASTIC MATERIALS

[75] Inventors: Stephen W. Amberg, Toledo, Ohio; Ralph G. Amberg, Youngs Mountain South, N.C.

[73] Assignee: Owens-Illinois, Inc., Toledo, Ohio

[21] Appl. No.: 131,713

[22] Filed: Mar. 19, 1980

[51] Int. Cl.$^3$ .............................................. A23G 1/20
[52] U.S. Cl. .................................. 425/296; 425/302; 425/344; 425/346; 425/357
[58] Field of Search ............... 425/302, 296, 344, 346, 425/357

[56] References Cited

U.S. PATENT DOCUMENTS 2,607,080  8/1952  Stewart ................................ 425/344
3,158,898  12/1964  Northrup et al. ................... 425/344

Primary Examiner—James R. Hall
Attorney, Agent, or Firm—John R. Nelson; Myron E. Click; David H. Wilson

[57] ABSTRACT

This invention provides a high output machine for effecting the production of organic thermoplastic articles by the compression molding technique. A plurality of molding members having open top molding cavities are movable around a horizontal closed loop path. A plurality of horizontally moving plungers are provided which are respectively co-operable with the molding members in a portion of their path to close the open top of the molding cavities. Successive gobs of heated organic thermoplastic material are deposited in the open top molding cavities at a point prior to the molding members moving into vertical alignment with the plungers. A relative vertical displacement between the plunger and the molding members is then effected to bring each plunger into engagement with the respective molding member and effect the compression molding of the inserted gob to conform to the molding cavity. After formation of the molded article and appropriate time for cooling, the molding members and plungers are relatively vertically displaced to permit the molded thermoplastic article to be removed from the molding cavity. In accordance with a specific embodiment of this invention, the molded article may comprise the end wall of a can and successive can side walls or bodies are respectively disposed in surrounding relationship to the plungers and carried into the compression molding area with the end portions of such bodies entering the molding cavity so that the compression molded end wall is formed around and united to the side wall in the compression molding operation.

12 Claims, 17 Drawing Figures

FIG. 7
FIG. 10
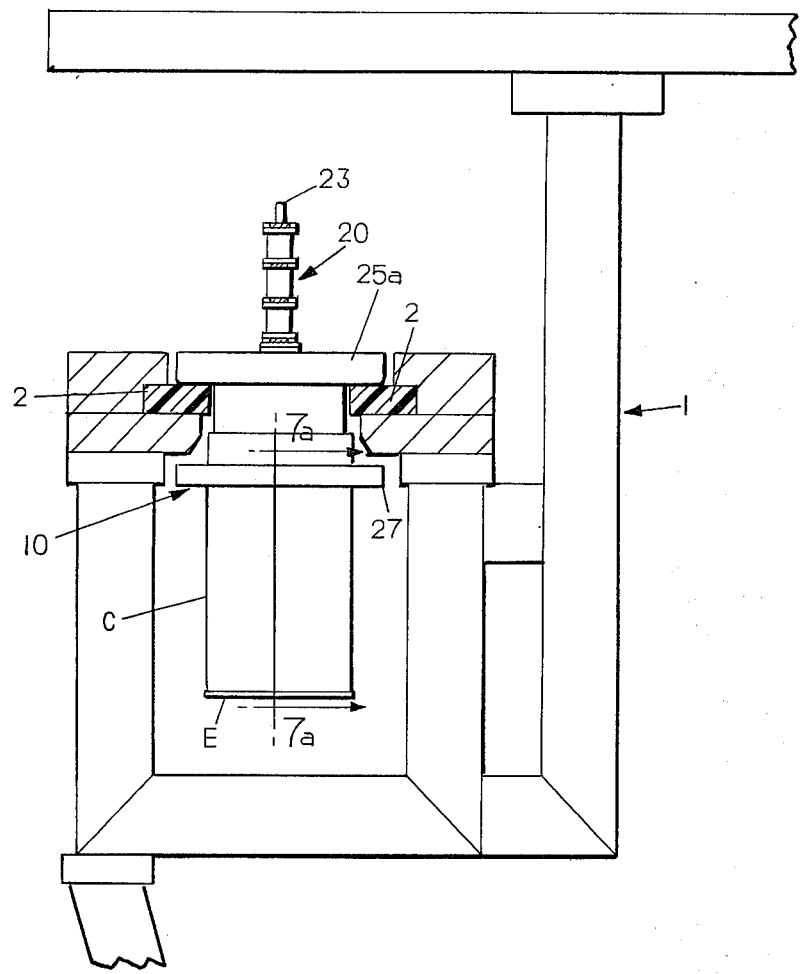
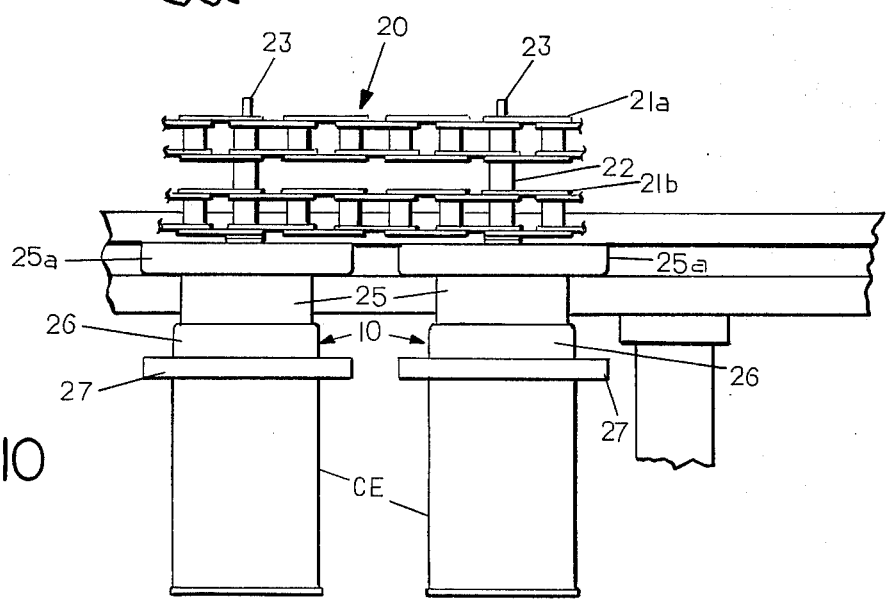

COMPRESSION MOLDING MACHINE FOR ORGANIC THERMOPLASTIC MATERIALS

BACKGROUND OF THE INVENTION

The utilization of compression molding of organic thermoplastic materials has not progressed much beyond the single mold stage. It is known that a heated gob of organic thermoplastic material may be deposited in a molding cavity and a plunger then moved into co-operation with the cavity opening to close the cavity and effect the compression molding of the heated gob to conform to the configuration of the molding cavity. When large quantities of thermoplastic articles are required, the prior art has heretofore resorted to multi-cavity injection molding. The greater the number of cavities, or the size of the article, the greater was the clamping force required to hold the mold together, hence the machine became larger and more expensive and the mold cost almost prohibitive. At the same time, the multi-cavity injection molding process is inherently an intermittent process and requires a significant portion of each molding cycle for the molds to remain in the closed position until the injection-molded articles are sufficiently cooled to permit the molding cavities to be open.

There is therefore, a need for an efficient, low-cost continuously operating molding apparatus for effecting the large quantity economic production of a variety of thermoplastic articles by the compression molding technique.

SUMMARY OF THE INVENTION

This invention provides a method and apparatus for the compression molding of large quantities of thermoplastic articles by successively depositing gobs of heated organic thermoplastic material into open top molding cavities respectively defined by a plurality of molding members which are continuously movable in a horizontal closed loop path. A plurality of molding plungers are provided which are respectively co-operable with the molding members to close the open top of the molding cavities. The molding plungers are mounted for continuous movement in a horizontal closed loop path in timed relationship to the movement of the molding members, and a portion of the closed loop path of the plungers is parallel to and overlies the path of the molding members subsequent to receiving a gob of thermoplastic material in their respective molding cavities. While the molding member and plungers are moving along their parallel paths, a relative vertical displacement of the plungers and molding members is effected to bring each plunger into co-operation with a respective molding cavity and thus effect the compression molding of the inserted gob of heated organic thermoplastic material to conform to the configuration of the molding cavity. Each plunger is maintained in engagement with the respective molding member only for a time period sufficient to effect the cooling of the compression molded thermoplastic article to a self-sustaining configuration, whereupon the plunger and molding members are relatively vertically displaced to free the compression molded thermoplastic article from both the plunger and the molding cavity.

In accordance with a modification of this invention, the molding cavity is designed to produce an end wall for a can The side wall of a can is applied in surrounding relationship to the plunger, which functions as a mandrel, and the extreme end of the side wall of the can is carried by the plunger into the molding cavity so that the end wall is compression molded into assemblage with the side wall element.

Further objects and advantages of the invention will be apparent to those skilled in the art from the following detailed description, taken in conjunction with the annexed sheets of drawings on which are shown two embodiments of the invention.

BRIEF DESCRIPTION OF DRAWINGS

FIG. 7 is an enlarged scale, partial sectional view taken on the plane 7—7 of FIG. 2.

FIG. 10 is an enlarged scale, side elevational view of the mandrel conveyor chain.

DESCRIPTION OF PREFERRED EMBODIMENT

Figure 1:
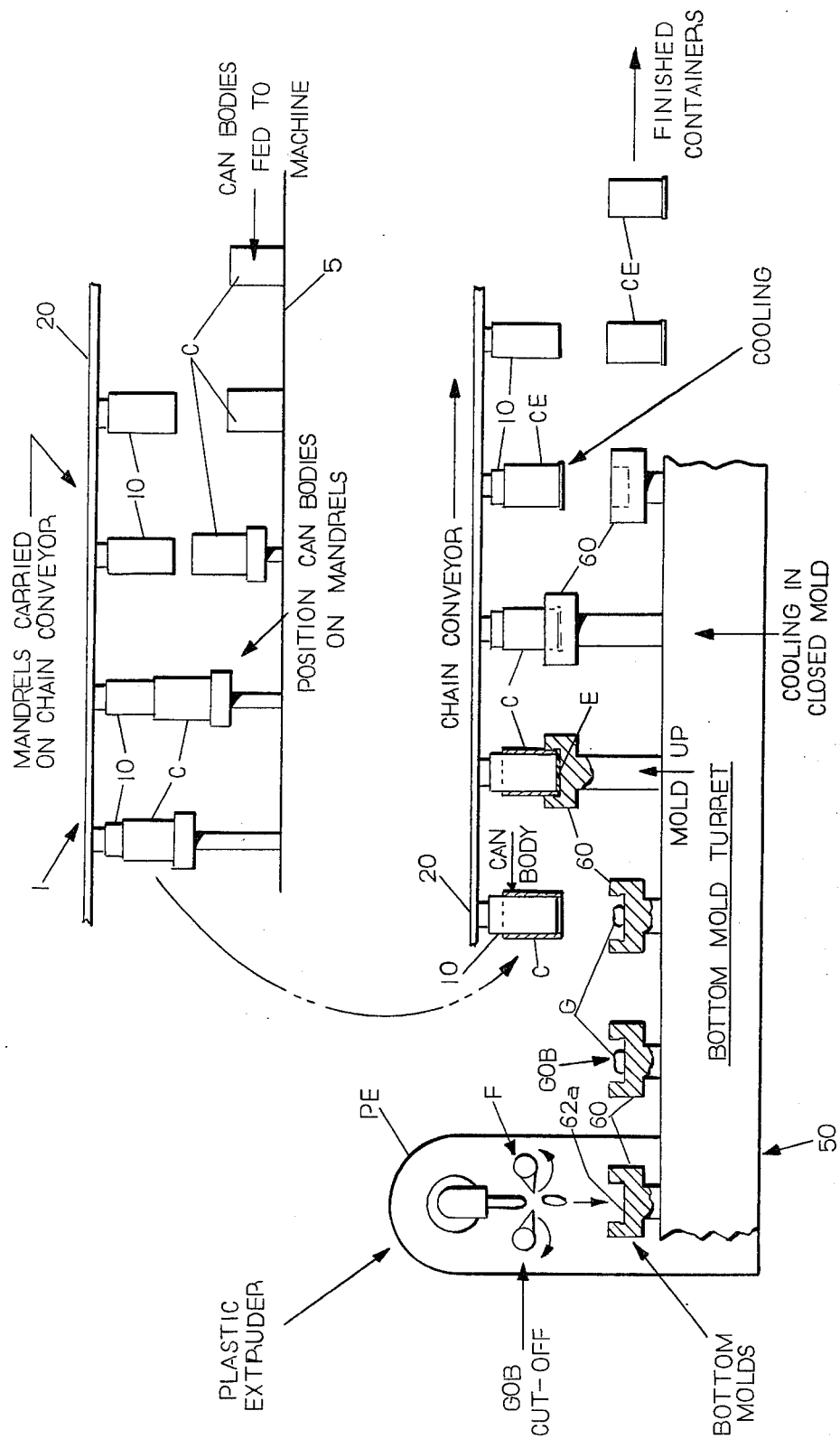
FIG. 1 is a schematic view illustrating the sequence of steps in the process embodying this invention of in situ forming of a thermoplastic can end on a can body by a compression molding technique.

The overall operation of a machine embodying this invention may be more clearly understood by reference to the copending application of Stephen W. Amberg, Ser. No. 081,960, filed Oct. 4, 1979, and assigned to the assignee of this application, and to the schematic process diagram of FIG. 1. Starting at the upper right hand corner of FIG. 1, it will be noted that the can bodies C are fed into the machine by a conveyor 5 and then are respectively positioned in surrounding relationship to the plungers or mandrels 10 carried in overhead relationship to the can bodies by the mandrel conveyor chain 20. The chain 20 brings the assembled can bodies C on mandrels 10 into alignment with the mold elements 60 within which a gob G of molten thermoplastic material produced by extruder PE has previously been deposited by the gob feeder F. After such alignment is achieved, each mold element 60 is elevated by a mechanism contained in the compression molding turret 50 to effect the compression molding of the thermoplastic gob between the bottom face of mandrel 10 and the mold element 60, thus forming the completed can end E around the bottom end portions of the can body C. The completed can body CE is then stripped from its carrying mandrel 10 and removed from the machine for further processing.

Figure 2:
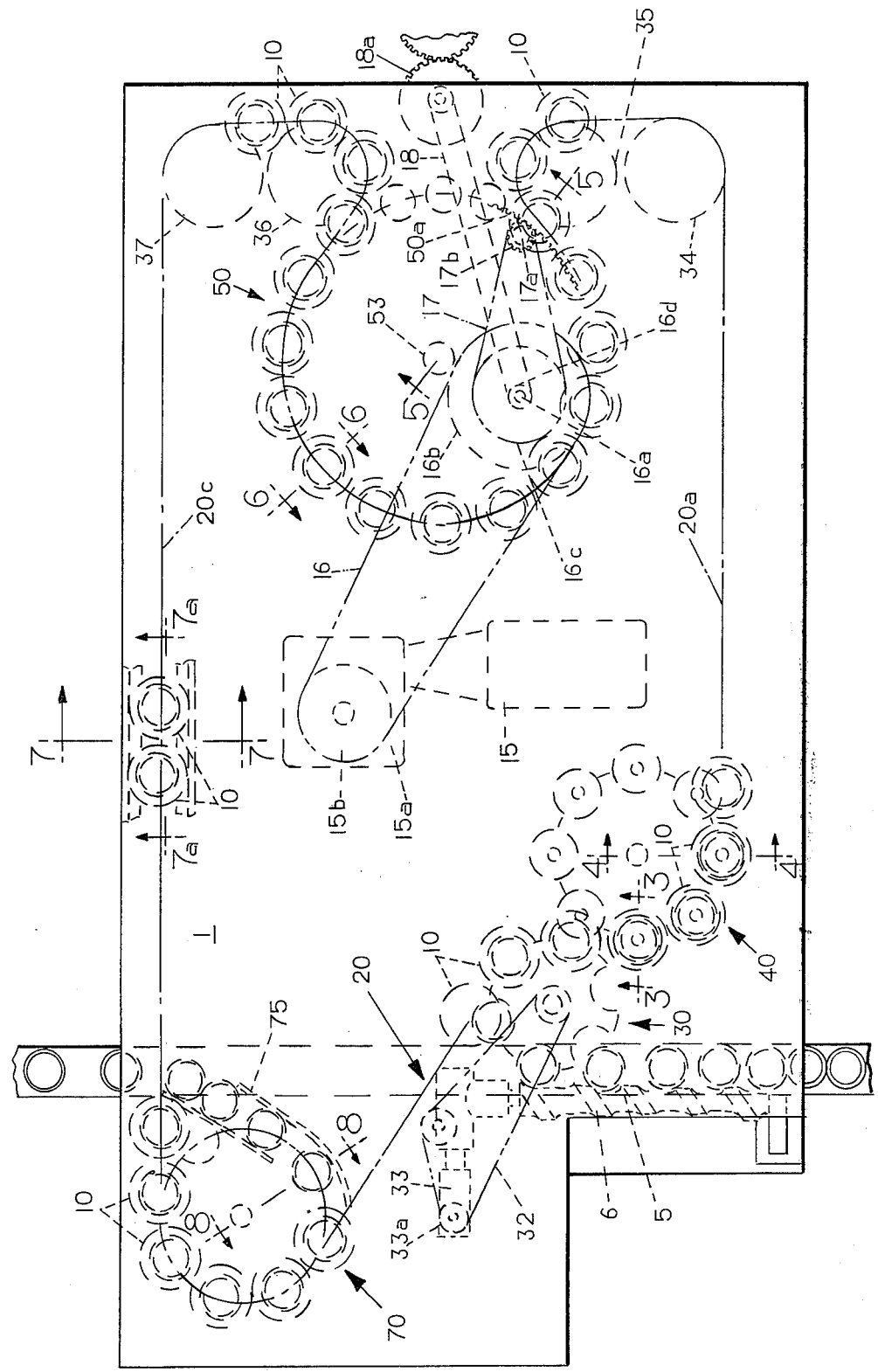
FIG. 2 is a schematic top elevational view of an apparatus embodying this invention for forming and assembling a thermoplastic can end on a can body by compression molding, with the mandrels omitted where necessary for clarity.
Figure 3:
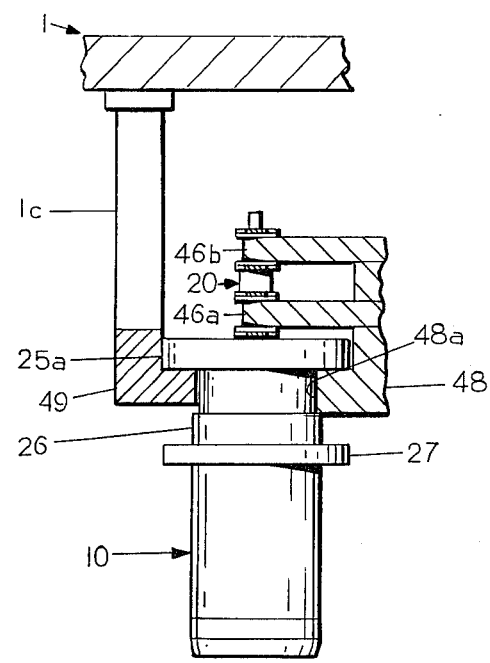
FIG. 3 is a sectional view taken on the plane 3—3 of FIG. 2.
Figure 3:
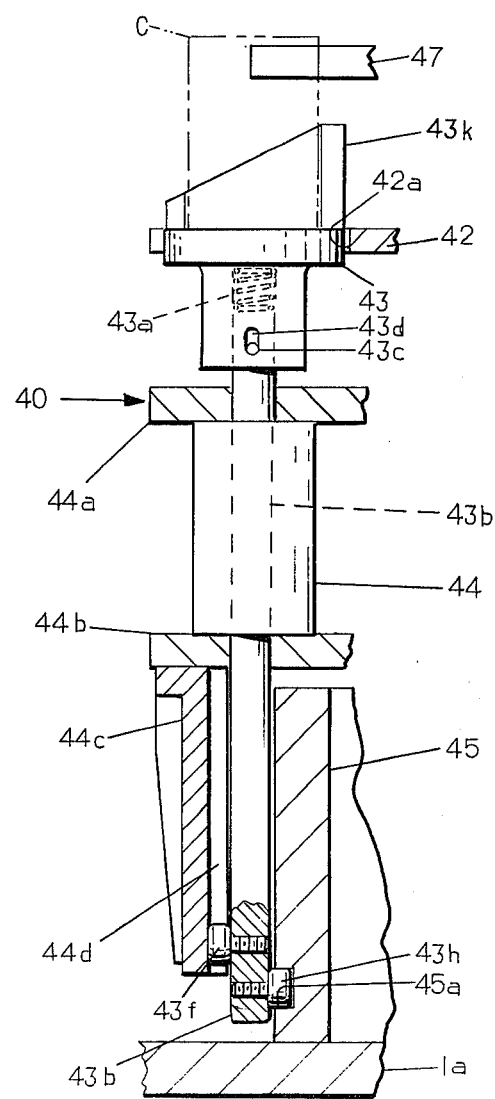
Figure 4:
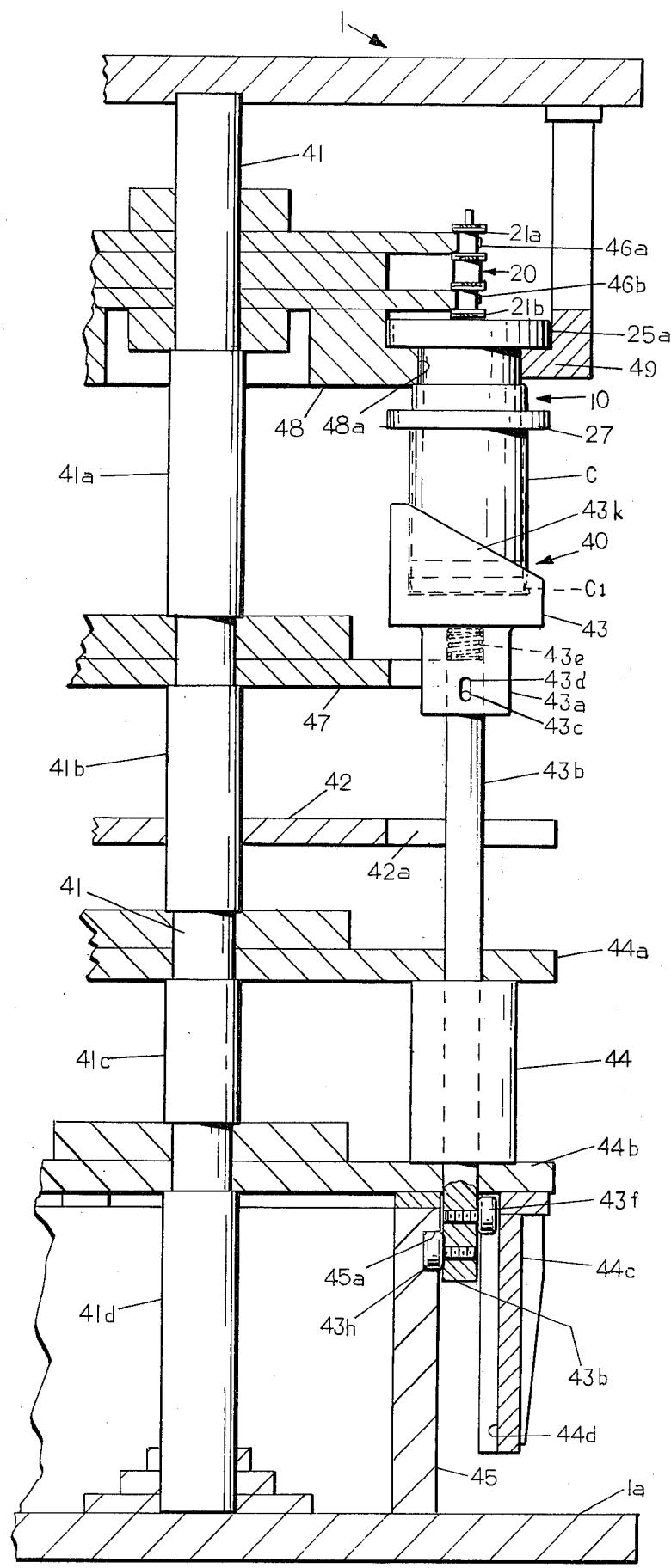
FIG. 4 is a sectional view taken on the plane 4—4 of FIG. 2.
Figure 5:
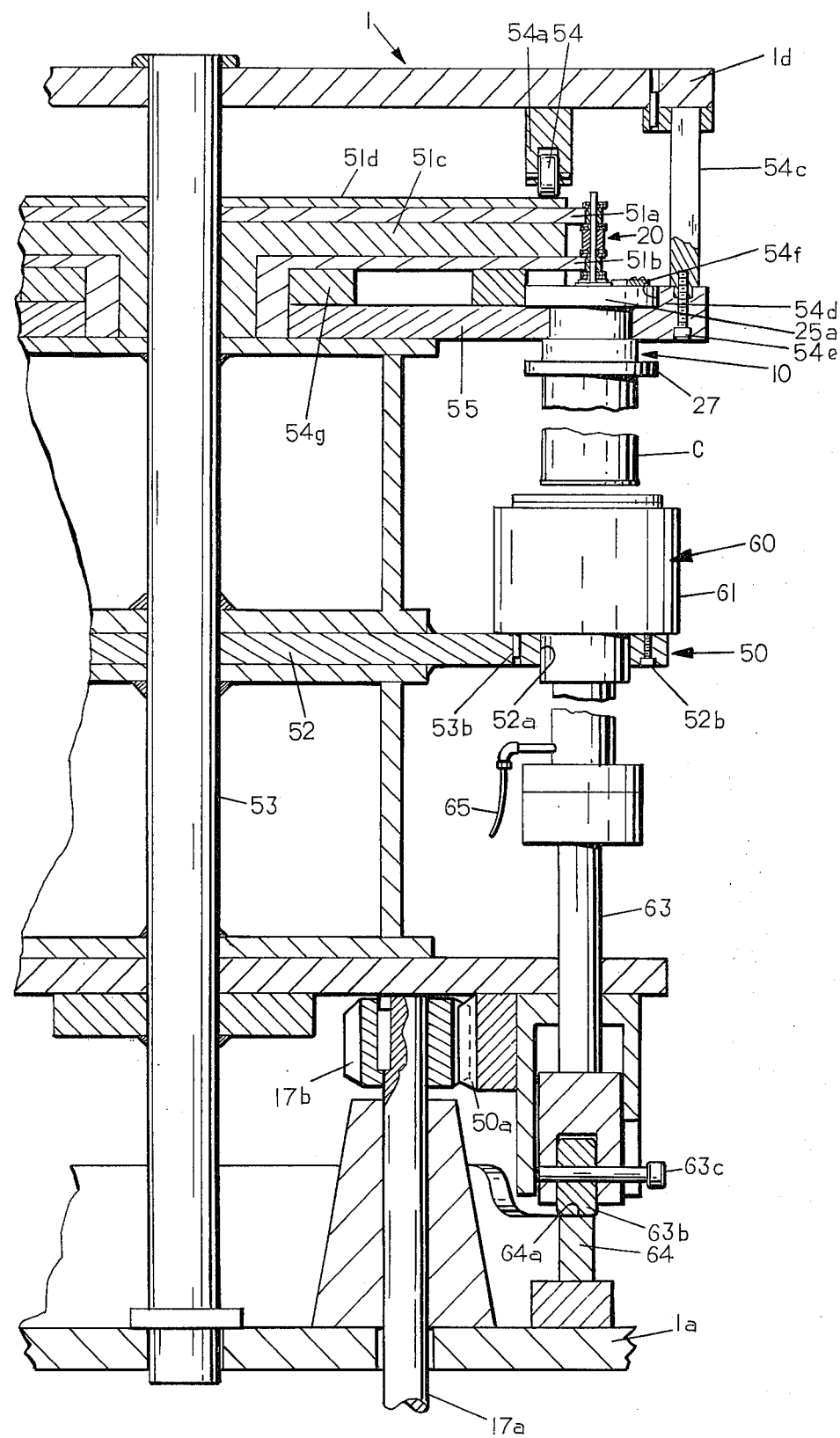
FIG. 5 is a sectional view taken on the plane 5—5 of FIG. 2.
Figure 9:
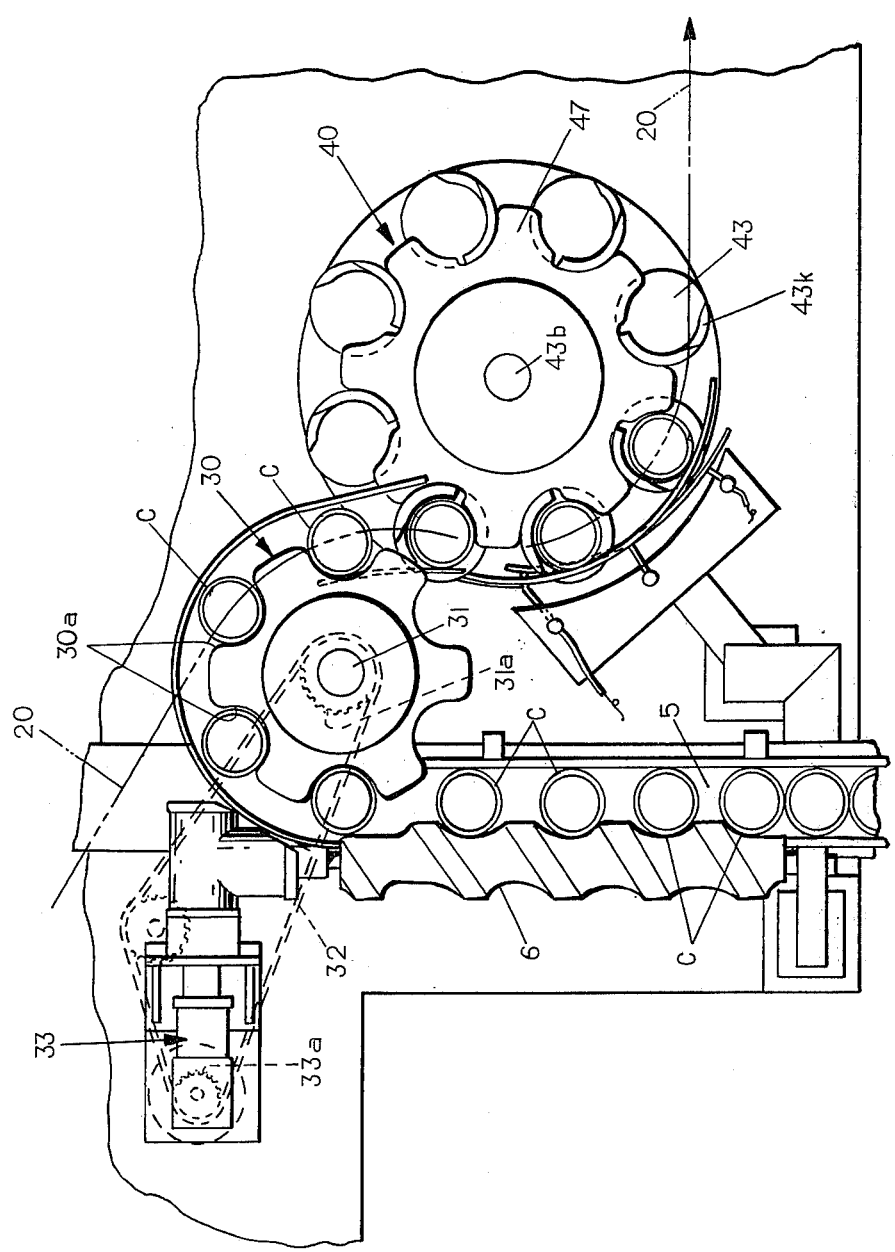
FIG. 9 is an enlarged scale top elevational view of the infeed mechanism employed in the apparatus of FIG. 2.
Figure 11:
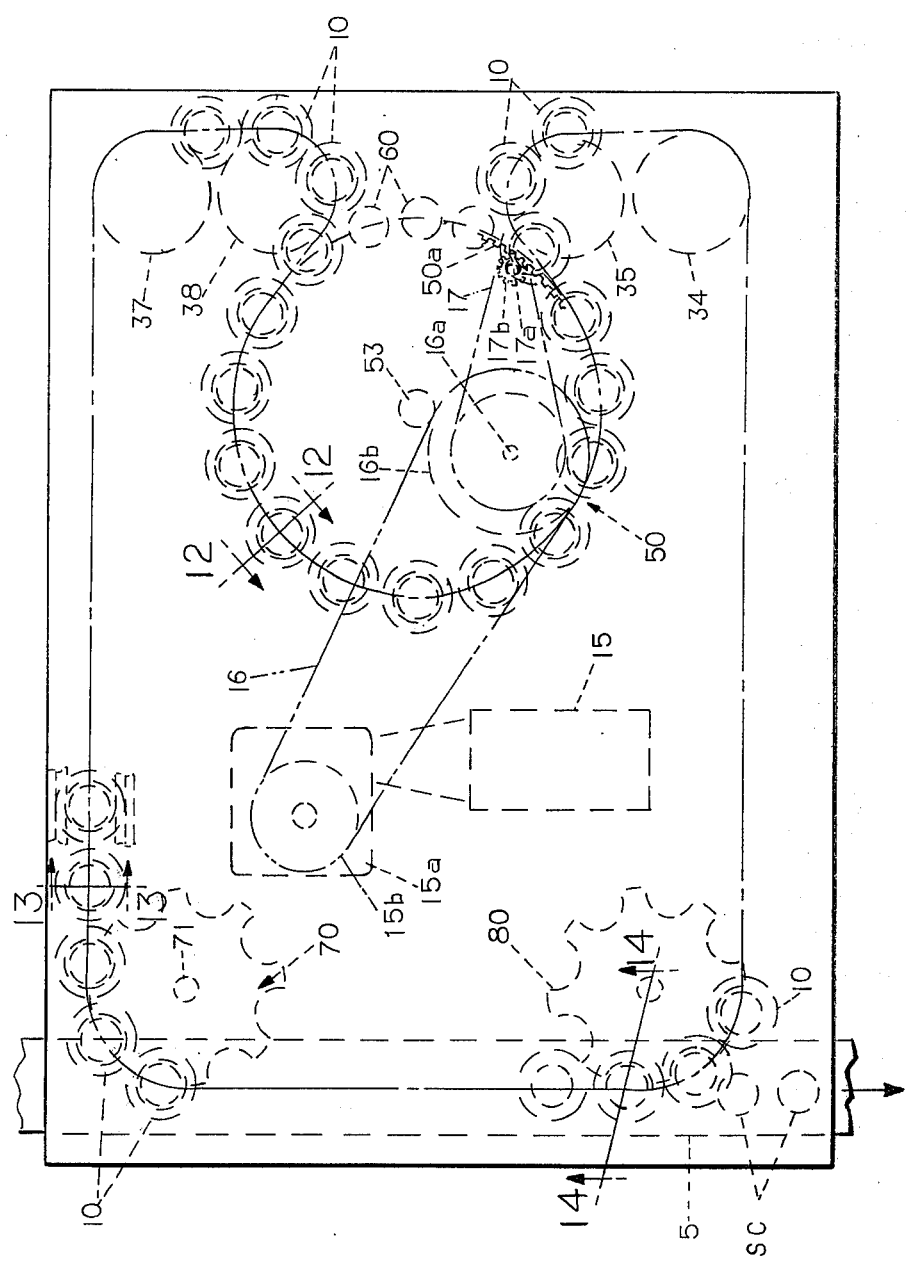
FIG. 11 is a schematic top elevational view of a modified form of apparatus for forming other types of plastic article by the compression molding technique.

Referring now to FIG. 2 illustrating an actual machine, a plurality of generally cylindrical mandrels 10 are carried in a closed horizontal loop path through the machine 1 by a power driven chain conveyor 20. Machine 1 has a conventional articulated frame structure formed by welding angle iron, channels and similar elements to provide the necessary mechanism supports. Previously formed fiber or plastic can side walls C are successively conveyed into the machine in an upright position by a horizontal conveyor 5. If the can side walls are fiber, they are provided with an outer and/or inner surface lamination of a plastic material that is thermally bondable to the material of gobs G. Conveyor 5 and worm 6 (FIG. 9) bring each successive can side wall C into engagement with the peripherally spaced pockets 30a of an infeed starwheel 30. Starwheel 30 in turn moves the can side walls C into a position respectively underlying the mandrels 10 and the vertically aligned mandrels 10 and can side walls C are moved around the periphery of a rotating mandrel assembly table 40. During the passage of the aligned mandrels 10 and the side walls C around the periphery of the rotating assembly table 40, the can side walls C are elevated to fit snugly around the periphery of the mandrels 10, as best shown in FIGS. 3, 4 and 5b, with the bottom end portions of mandrel 10 spaced slightly inwardly from the lower end C1 of side wall C.

The mandrels 10 with the can side walls C assembled thereto are then moved in a linear path 20a by the conveyor chain 20, then around the perpheries of a pair of guide sprockets 34 and 35, and are then carried around the circular perimeter of the compression molding turret 50 by engagement of conveyor chain 20 with sprocket teeth 51a and 51b (FIG. 5) formed on the turret 50. As the mandrels 10 and can side walls C mounted thereon pass around the perimeter of the compression molding turret 50, they are disposed in aligned overlying relationship respectively to a circular array of compression mold elements 60 which are continuously moved in a circle by the rotary compression molding table 52. During a portion of the rotary path of the compression mold elements 60 carried by the compression molding table 50, the female molding cavities 62a (FIGS. 1 and 5b) of such mold elements 60 are exposed to receive a gob G of heated thermoplastic material dropped from a suitable feeder indicated schematically by the shears F. Each gob is of substantially the same quantity of material. A preferred feeder is described and illustrated in detail in the co-pending application of James W. Buckingham, Ser. No. 131,712, filed concurrently with this application, and of common ownership.

Figure 6:
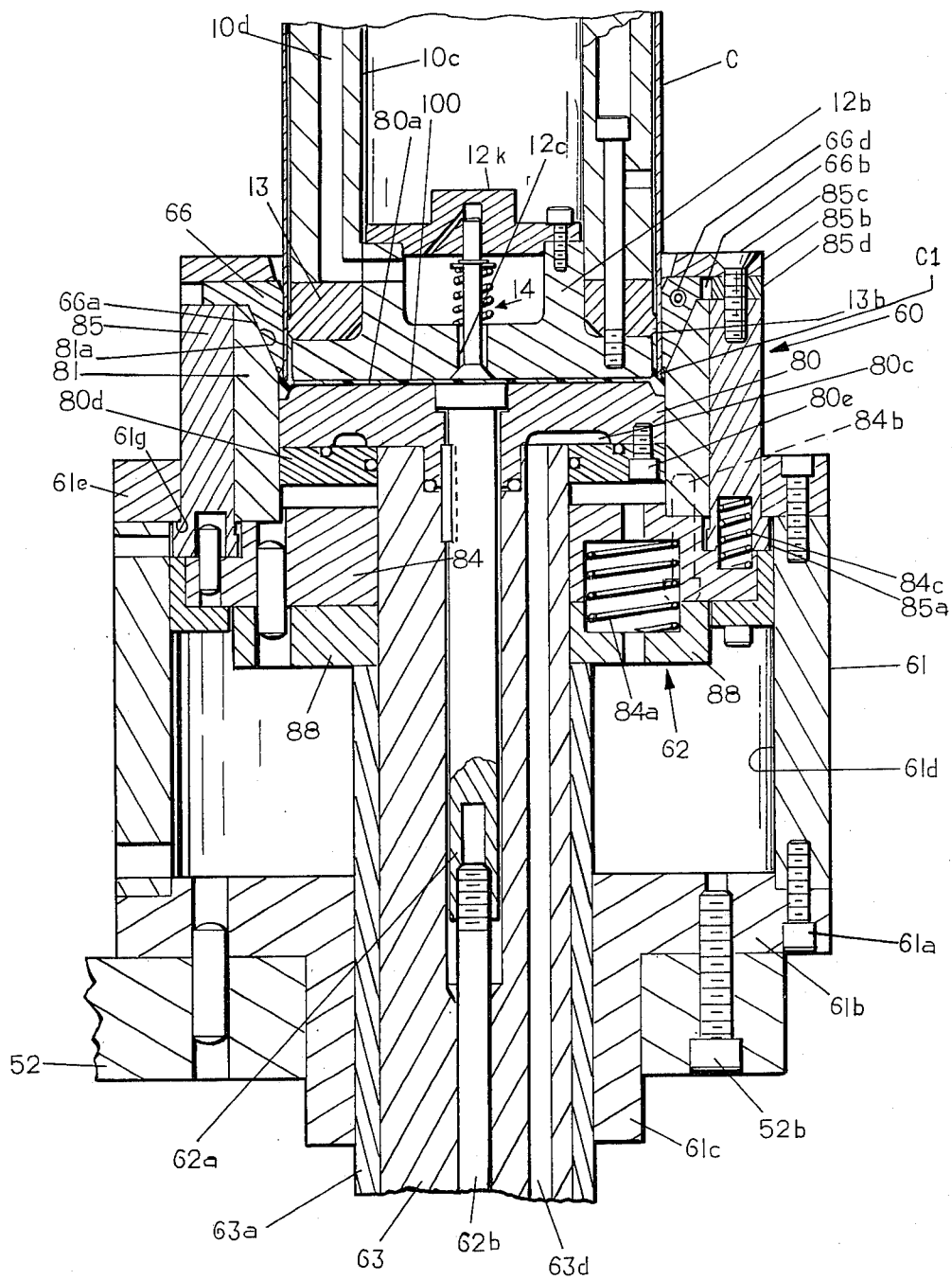
FIG. 6 is an enlarged scale, partial sectional view taken on the plane 6—6 of FIG. 2.

During the passage of the mandrels 10 around the compression molding turret 50, the compression mold elements 60 are vertically elevated to surround the exposed bottom end C1 of the can wall C and enclose same in the molding cavity 100 defined between the end face of mandrel 10 and the co-operating mold element 60 (FIG. 6). The interposed gob G of plastic material is subjected to substantial pressures by the vertical closing movements of the mold element 60, and the thermoplastic material is distributed throughout the molding cavity 100 under significant pressures, generally on the order of at least 200 to 500 pounds per square inch, thereby producing the molding of a can bottom end E (FIG. 6) in attached relationship to the can side wall C.

The compression molding is completed as the mandrels 10 and the co-operating mold elements 60 move around the perimeter of the compression molding turret 50. As they approach the end of their rotary path around the turret, the compression mold elements 60 are lowered to a position out of engagement with the overlying mandrels 10. Air cooling of molded can end wall E can then be initiated.

Figure 8:
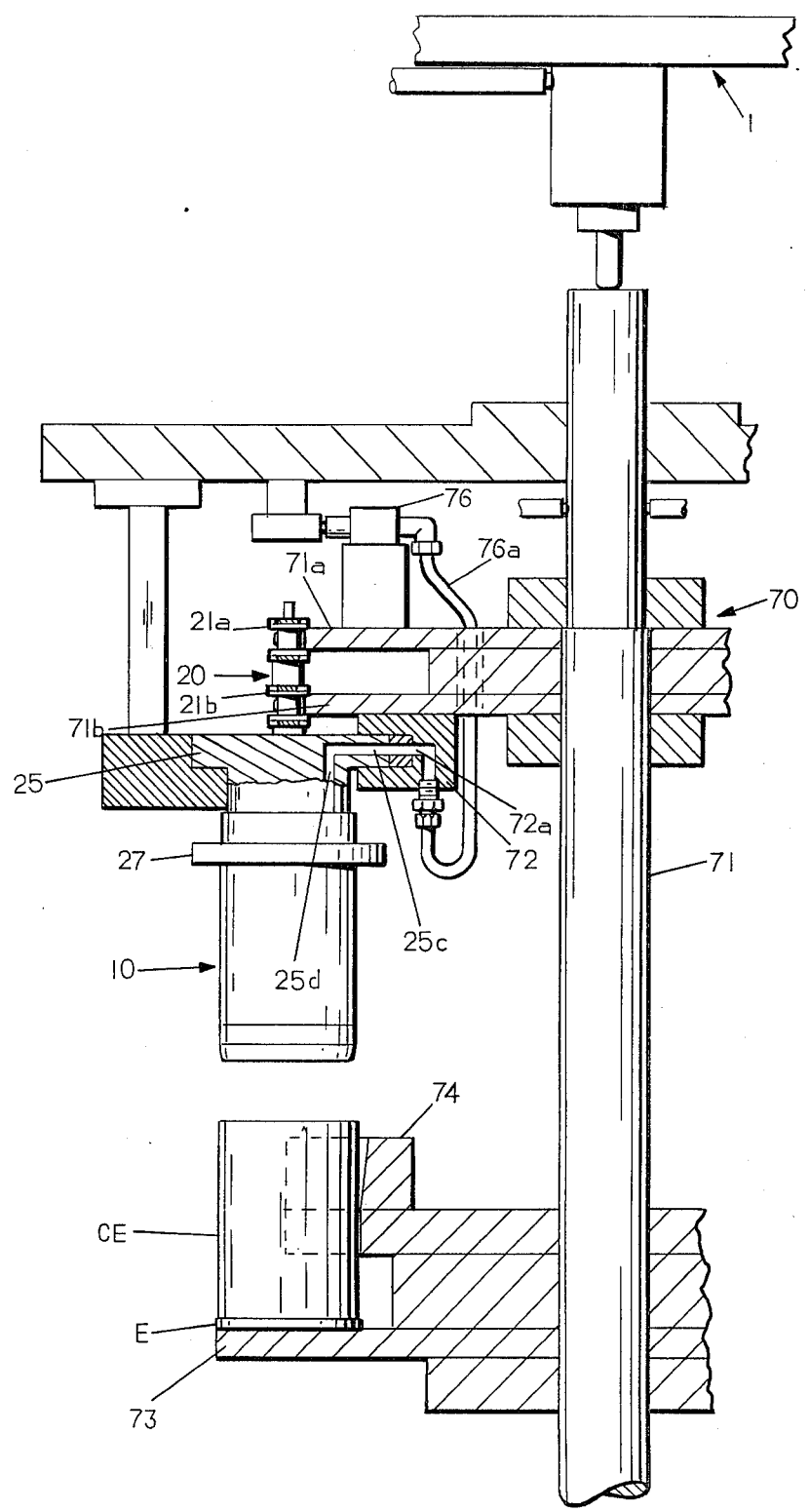
FIG. 8 is an enlarged scale sectional view taken on the plane 8—8 of FIG. 2.

The chain 20 carrying mandrels 10 is then trained around two idler sprocket elements 36 and 37 and then directed rearwardly toward the entry end of the machine along a horizontal linear path 20c. Path 20c of conveyor chain 20 carries the mandrels 10 with the completed can body CE above the conveyor 5 and around a disassembly table 70. Further air cooling of the molded can end E is accomplished along linear path 20c. As the mandrels 10 are carried around the perimeter of wheel 70, pressured air is supplied to the hollow interior of each mandrel 10 sufficient to push off the completed can body C with the integrally molded can end E attached thereto (FIG. 8). The completed can body CE is then directed by suitable guides 75 onto the output end of the input conveyor 5 and removed from the machine 1 for further processing.

All elements of the machine are driven from a single power source 15 through a gear reduction unit 15a and a primary drive sprocket 15b. A chain 16 connects the primary drive sprocket 15b to reduction sprocket 16b mounted on shaft 16a. A pair of sprockets 16c and 16d are driven by shaft 16a. Sprocket 16c is connected by chain 17 to a shaft 17a to drive small gear 17b which engages a large internal gear 50a to rotate the compression molding turret 50. Sprocket 16d is connected by a chain 18 to a gearing mechanism 18a which effects the synchronous operation of the gob feeder F. The conveyor chain 20 carrying the cylindrical mandrels 10 is engaged by suitable teeth 51a and 51b (FIG. 5) provided on the perimeter of the compression molding turret 50 to effect the driving of such chain. Hence chain 20 is driven in exact synchronism with the rotational movement of the compression molding turret 50. Chain 20 is also employed to effect the driving of the disassembly table 70, the mandrel assembly table 40, by which the can side walls C are assembled on the mandrels 10, and the infeed starwheel 30.

Infeed starwheel 30 is mounted on a vertical shaft 31 which in turn is keyed to sprocket 31a (FIG. 9) which drives a chain 32. Chain 32 drives an input sprocket 33a of a gear reduction mechanism 33 which effects the rotation of an input spacing worm 6 which is disposed adjacent to the input conveyor 5 to move the can side walls or bodies C into the pockets 30a of the infeed starwheel 30 in timed relationship.

The important structural details of each of the major mechanisms embodied in the machine will now be described.

MANDRELS AND MANDREL CONVEYOR

Figure 5A:
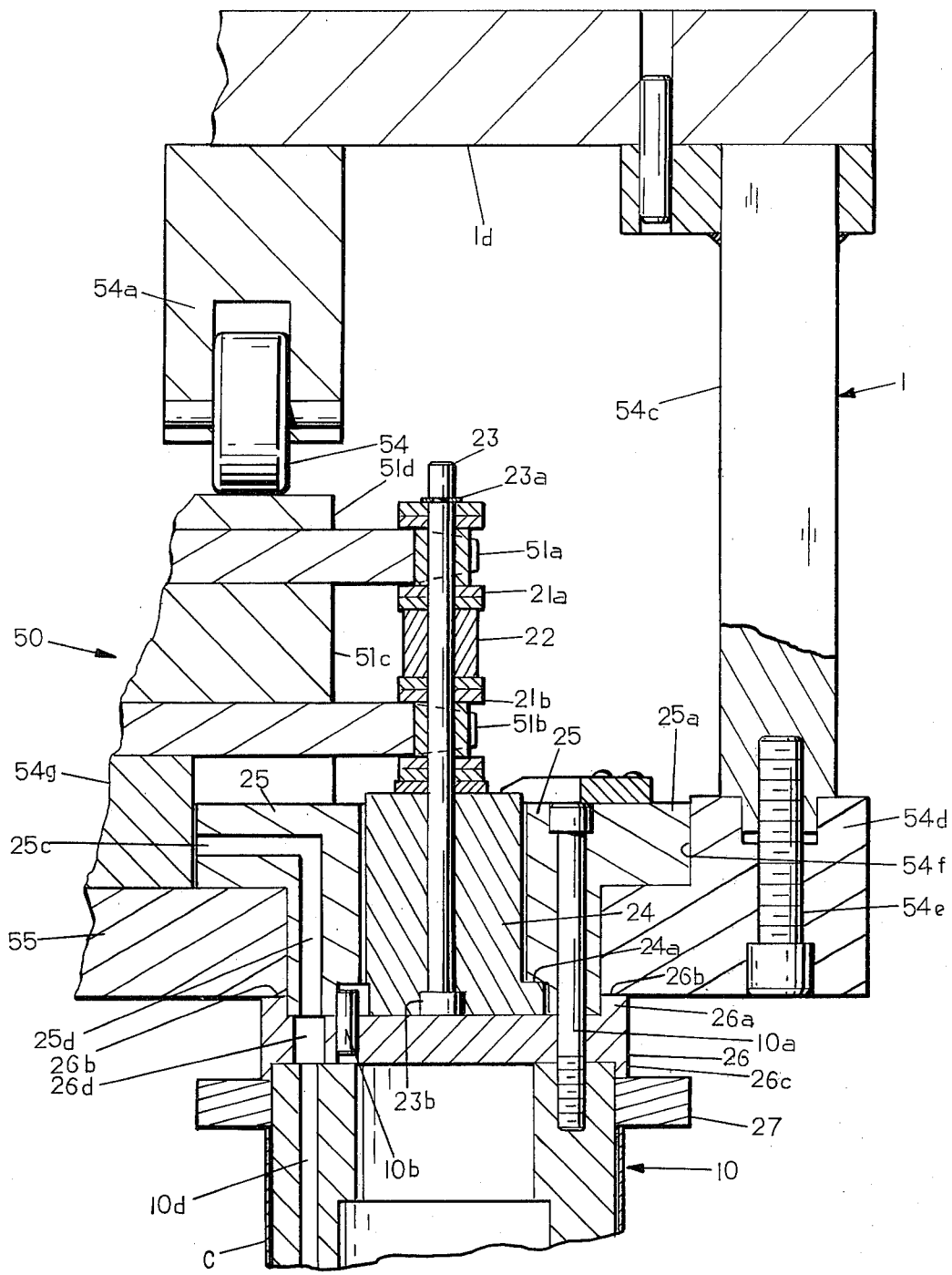
FIG. 5a is an enlarged scale view of the upper portion of the mechanism shown in FIG. 5.
Figure 5B:
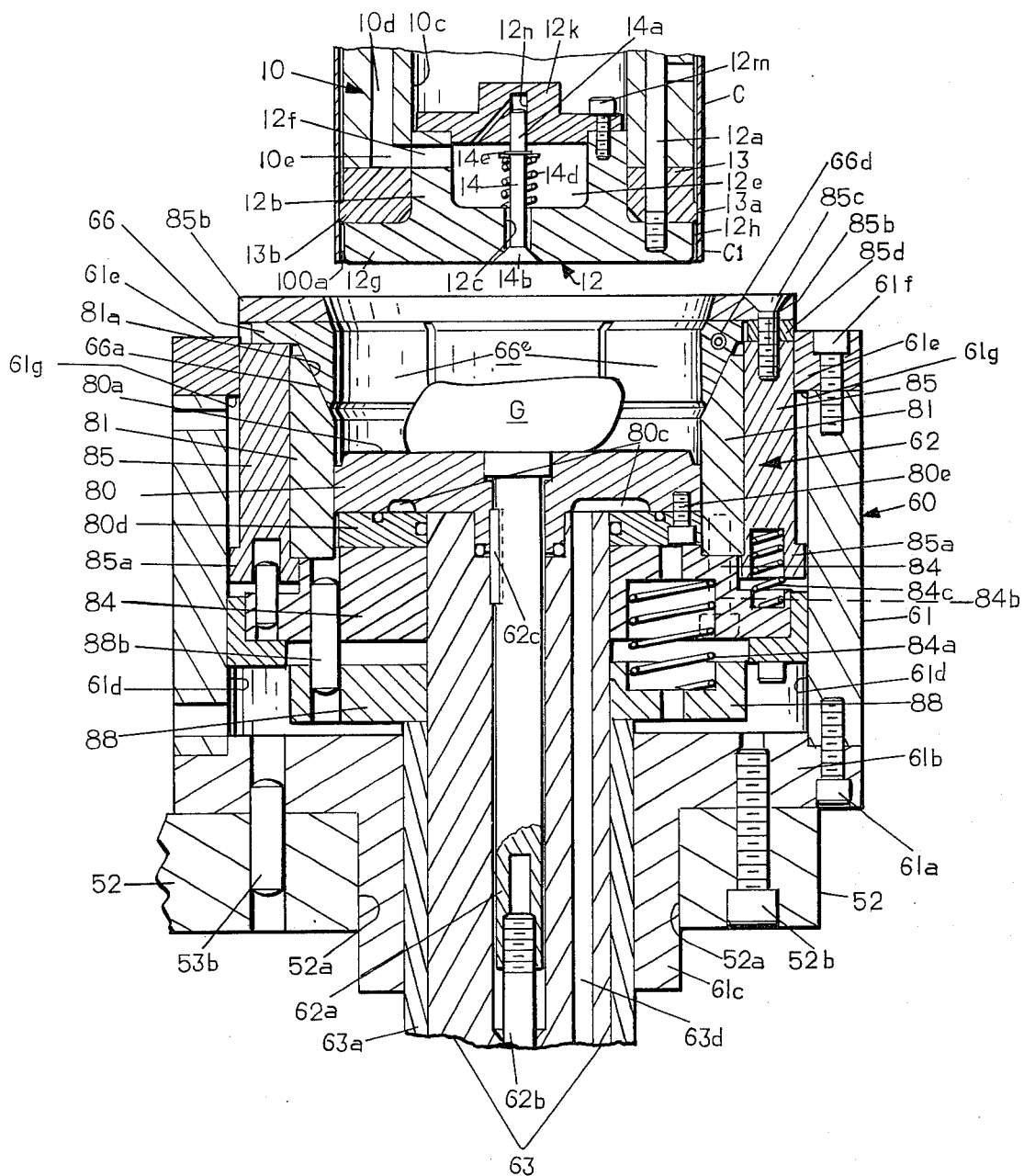
FIG. 5b is an enlarged scale view of the lower portion of the mechanism shown in FIG. 5.

Referring specifically to FIGS. 5a and 10, the mandrel conveyor chain 20 is shown as comprising two link type chains 21a and 21b disposed in spaced vertical alignment by bushings 22 mounted on common pivot pins 23 provided at spaced intervals along the length of the chain. The top portion of each pivot pin 23 is retained against downward vertical movements by snap ring 23a and the headed bottom portion 23b of the pin 23 extends in depending relationship a significant distance below the lowermost chain 21b to support a mandrel bushing 24 which in turn provides support for a mandrel assemblage 10 in depending relationship thereto. Two such pins 23 for each mandrel assemblage may be desirable.

Figure 7A:
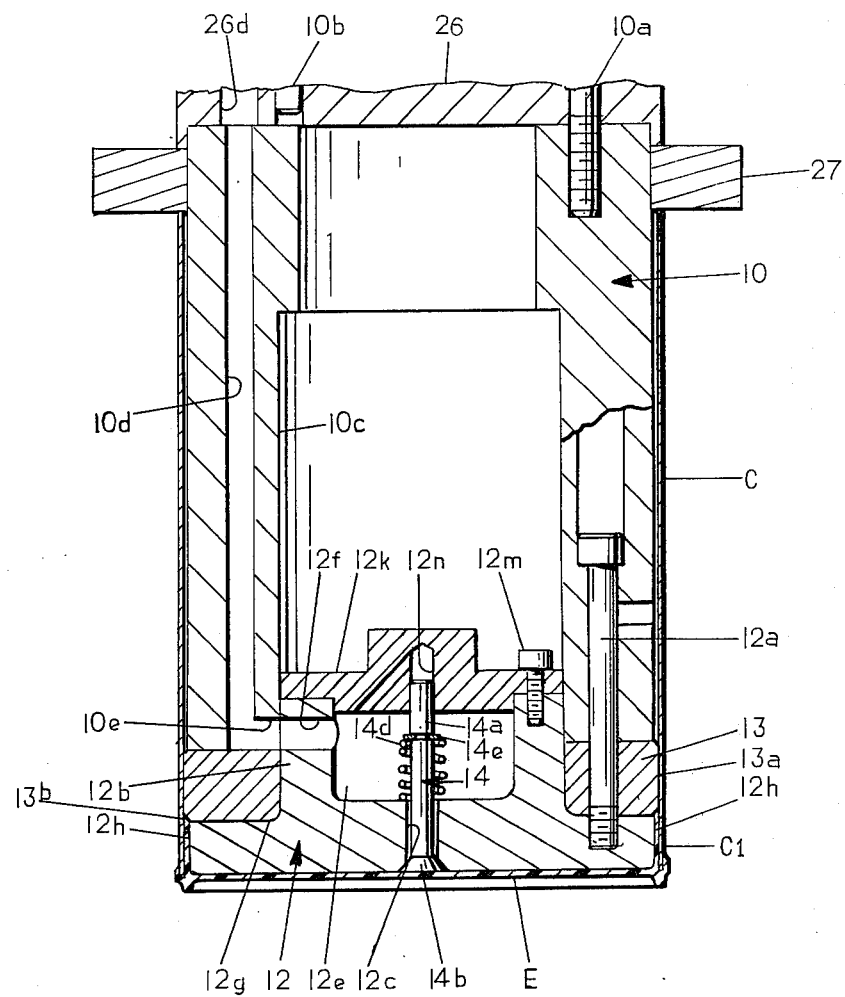
FIG. 7a is an enlarged scale sectional view taken on the plane 7a—7a of FIG. 7.

Bushing 24 has a radially projecting shoulder 24a at its lower end upon which the lower end of mandrel guide bushing 25 is supported. Bushing 25 in turn has a radially projecting shoulder 25a at its upper portion which provides vertical support to the mandrel assemblage 10 by engaging appropriately shaped guide rails provided on the various rotary tables and on the articulated frame of the machine 1, such as nylon rails 2 shown in FIG. 7. The particular guide rails shown in FIG. 5a constitute an inner circular rotating pocket rail 55 provided on the compression molding turret 50 and an outer annular rail 54d supported in surrounding radially spaced relationship to the inner guide rail 55 by the articulated frame structure of the machine 1.

The mandrel 10 which is essentially of hollow tubular configuration is secured to the mandrel guide bushing 25 by a plurality of circumferentially spaced bolts 10a. Dowel pins 10b are provided to insure the vertical alignment of the mandrel 10 with the guide bushing 25. Intermediate guide bushing 25 and the top end of the mandrel 10 there is provided a circular plate 26 having an annular top shoulder 26a embracing the bottom end of guide bushing 25 and providing a top guide surface 26b for limiting any upward displacement of the mandrel assemblage 10, particularly during the compression molding operation. A lower annular flange 26c on circular plate 26 snugly surrounds the top end of mandrel 10 and provides a backing for a washer 27 which is press fitted to the top end portion of mandrel 10 and functions as a stop for the upward movement of a can body C applied to the mandrel 10.

The lower end of mandrel 10 is closed by a centrally apertured mold plate 12 (FIG. 5b and 7a) which is secured to the lower end of mandrel 10 by a plurality of peripherally spaced bolts 12a. Mold plate member 12 is provided with an upstanding annular flange or rib 12b which fits snugly within the interior of the hollow mandrel 10, snugly engaging the bore surface 10c thereof. The top surface of the annular rib 12b is closed by a cap 12k which is secured thereto by a plurality of peripherally spaced bolts 12m. A fluid pressure chamber 12e is thus defined.

Cap 12k has a central bore 12n to receive the end of a plunger portion 14a of a valve 14 mounted in the central aperture 12c of the mold plate 12. Valve 14 has a conical head portion 14b which cooperates in sealing relationship with the correspondingly shaped end of the central aperture 12c. A spring 14d operates between the top surface of the valve plate 12 and a snap ring 14e provided on the stem portion 14a of plunger 14 to maintain a bias on such plunger to normally keep it in the closed position until an overriding air pressure is applied to chamber 12e.

Suitable passages for applying air pressure to the chamber 12e defined between the cap 12k and the annular flange 12b are provided, such as the radial passage 25c in the guide bushing 25 (FIG. 5a) which communicates with an axially extending passage 25d, than an axially extending passage 26d provided in the bushing 26, then an axially extending passage 10d in mandrel 10 communicating with a radial passage 10e (FIGS. 5b and 7a) and thence through a radial passage 12f into the pressure chamber 12e. This arrangement of fluid passages permits the accomplishment of the removal of the completed can CE. When each mandrel 10 reaches the dis-assembly station 70, an increase in the pressure of air supplied to chamber 12e will effect opening of valve 14 and a literal blowing off of the can body wall C with the end wall E integrally attached thereto.

A radial flange 12g defined on the outer side of the upstanding annular wall 12b of mold plate 12 provides a space for mounting an annular mold ring 13 whose peripheral surface 13a is displaced slightly outwardly beyond the peripheral surface of the remainder of the mandrel 10. Hence when a can side wall C is assembled on the mandrel 10, it will be snugly engaged by the peripheral surface 13a, but slightly spaced from peripheral surface 12h of the mold plate 12. Additionally, the lower outer corner 13b of mold ring 13 is bevelled and this provides the annular end wall of the molding cavity 100 (FIG. 6) which is defined between the lower end of each mandrel assemblage 10 and a co-operating mold element 60. A space 100a is thereby defined in the molding cavity 100 which includes the inner wall of end portions $C_1$ of can body wall C, thereby assuring that the molten plastic material forming the can end E is intimately engaged with the can body wall C. A detailed description of each molding element 60 will be hereinafter presented in the description of the rotary compression molding turret 50.

MANDREL LOADING OPERATION

As previously indicated, the rotary table 40 accomplishes the application of successive can body walls C to successive mandrels 10. The mechanism for supplying the can body walls C to the rotary assembly table 40 includes the power driven worm feeder 6 and the input starwheel 30, both of which are of conventional construction and require no further description. Referring particularly to FIGS. 3 and 4, the rotary mandrel loading table 40 will be seen as comprising a vertical shaft 41 which is appropriately journalled by the articulated frame of the machine 1. A can body transport table 42 is keyed to shaft 41 and is provided on its periphery with a plurality of generally semi-circular openings 42a within which a circular applicating plate 43 is mounted for reciprocating vertical movement. Each plate 43 has a depending bushing portion 43a mounted on a vertical plunger shaft 43b. A limited lost motion connection is provided between bushing 43a and shaft 43b by virtue of a set screw 43c traversing an axial slot 43d provided in the bushing 43a. A spring 43e effectively secures the sleeve applicating plate 43 to shaft 43b for upward vertical movement.

Shaft 43b is journalled for axial vertical movement and moved around the drive shaft 41 by a bushing 44 which is mounted between two drive plates 44a and 44b, both of which are keyed to shaft 41 for co-rotation. The outer periphery of plate 44b carries an annular depending guide sleeve 44c, which is provided with a plurality of vertically extending slots 44d which respectively receive rollers 43f suitably secured to the lower end of the shaft 43b to insure that the shaft moves in a vertical plane.

Vertical movements of shaft 43b are controlled by a fixed annular cam plate 45 which is secured to a base element 1a of the frame of machine 1 and has an annularly extending cam slot 45a provided in its side wall. A roller 43h suitably mounted on the lower end of plunger shaft 43b engages the cam slot 45a and the vertical position of the plunger shaft 43b, and hence the applicating plate 43, is thereby determined by the configuration of the annular cam track 45a.

As previously mentioned, the input starwheel 30 successively transfers can bodies C onto circular plates 43. Each plate 43 is provided with a substantially semi-circular upstanding side wall 43k to stop the incoming movement of the can side wall C in a position concentric with the axis of plunger shaft 43b. Additionally, a star wheel 47 affixed to shaft 41 provides further support to can bodies C.

At the same time, the mandrels 10 are brought into successive overhead alignment with the applicating plates 43 by the engagement of the links 21a and 21b of the mandrel conveying chain 20 with the teeth of two sprockets 46a and 46b respectively secured to the top portions of center shaft 41. As previously mentioned, the interengagement of the conveyor chain 20 with such sprockets imparts the rotational driving movement to the shaft 41 and hence operates the entire assembly table 40 in synchronism with the movements of the mandrels 10 around the periphery of the table. To insure the exact alignment of each plunger 10 with the underlying can wall C, the assembly table 40 is provided with a positioning ring 48 secured in depending relationship to sprocket 46b and having semi-circular pockets 48a engaging mandrel bushing 25a of mandrel 10. An outer annular guide rail 49 secured in depending relation to a frame element 1c engages the outer periphery of bushing 25a.

Sleeves 41a, 41b, 41c and 41d on center shaft 41 provide spacing and vertical support for the various rotating tables.

As each mandrel 10 and the respective vertically aligned can body C proceed around the periphery of the assembly table 40, the cam track 45a effects the elevation of shaft 43b and hence raises the applicating plate 43, carrying with it the can body wall C and forces the can body wall C around the external surfaces of the mandrel 10 until the top edges of the body wall C engage the stop ring 27. In the event that the particular body wall C is slightly oversize, the spring 43e provided between shaft 43b and applicating plate 43 absorbs any such oversize dimension without imparting any injury to the particular can side wall C. Hence, as each mandrel 10 leaves the assembly station 40 on the conveyor chain 20, it will carry therewith a can side wall body C snugly engaged on the mandrel 10 by virtue of its frictional engagement with the protruding ring 13 provided on the bottom portions of mandrel 10.

COMPRESSION MOLDING TURRET

As previously mentioned, the required rotational movement of the rotary compression molding turret 50 is imparted by the pinion 17b engaging internal ring gear 50a carried by rotary table 52 which is welded or keyed to a central vertical shaft 53, which is suitably journalled on the articulated framework of the machine 1. Because the individual mandrel assemblages 10 are subjected to a very substantial upward force during the compression molding operation, which is accomplished in a portion of the path of such mandrels around the compression molding turret 50, a comprehensive reinforcing mechanism to resist such upward force is provided. Thus, the sprockets 51a and 51b which drive chain links 21a and 21b of mandrel conveyor chain 20, are interconnected by a rigid annular ring 51c and the top sprocket 51a has an additional annular ring 51d secured thereto. Sprockets 51a and 51b are keyed or welded to control shaft 53. Ring 51d bears against the peripheries of a plurality of thrust rollers 54 which are respectively journalled in a circumferentally spaced array of depending brackets 54a which are in turn rigidly secured to a massive overhead horizontal beam elements 1d of the articulated frame structure of the machine 1. Thus upward thrust exerted on the sprockets 51a and 51b by the successive mandrels 10 carried by the conveyor chain 20 is effectively absorbed. Additionally, an annular support ring 54c is secured to horizontal frame elements 1d in depending relationship and supports an annular guide block or rail 54d which is secured to the bottom end of ring 54c by bolts 54e. The inner surface 54f of the guide block 54d snugly conforms to the outer periphery of the mounting bushing flange 25a provided on each mandrel assemblage 10. The inner periphery of the mounting bushing flange 25a is supported by semi-circular pockets provided on the periphery of rotating circular pocket rail 55, and an annular reinforcing ring 54g is mounted between the top surface of rotating pocket rail 55 and the bottom surface of pinion 51b. Thus, as each mandrel assemblage 10 is moved around the periphery of the compression molding turret 50, it is apparent that it is rigidly supported against any vertical or horizontal displacements from the rotary path.

As mentioned, the circular molding table 52 is mounted on the lower portions of shaft 53 for co-rotation. Molding table 52 provided with a plurality of circumferentially spaced apertures 52a which respectively receive reduced diameter end portion 61c of molding element 60. The spacing of the molding elements 60 corresponds, of course, to the circumferential spacing of the mandrels 10, so that each molding element 50 is vertically and co-axially aligned with a molding element 10 moving around the periphery of the compression molding turret 50.

Each molding element 60 (FIG. 5b) comprises an outer housing defined by a sleeve 61 which is secured by peripherally spaced bolts 61a and dowels to an annular base 61b having an axially extending stem portion 61c projecting through the openings 52a provided in the table 52. Bolts 52b secure each housing 61 to the table 52, and dowel pins 53b assure the alignment. Within the cylindrical bore 61d defined by sleeve 61, the female half of a compression mold mechanism 62 is slidably mounted for vertical movements relative to the table 52, hence relative to the overlying mandrel 10. A stop ring 61e is secured by bolts 61f to the top of sleeve portion 61. Ring 61e has its inner periphery overlying the bore 61d and hence functions as a stop for the upward movement of a portion of the female mold mechanism 62.

Mold mechanism 62 constitutes an assemblage of three vertically spaced annular elements 80, 84 and 88, which are movable vertically in a desired sequence by a vertically shiftable shaft 63.

The annular element 80 has a top surface 80a that forms the bottom portions of the molding cavity 100 when the female mold mechanism 62 is disposed in closed relationship with respect to the mandrel 10. Annular element 80 is rigidly secured to the top end of a vertical actuation shaft 63 by an axially disposed elongated hollow bolt 62a, which threadably engages the top end of a bolt 62b, which is suitably secured within the lower portions of the hollow bore of the actuating shaft 63. A key 62c engages bolt 62a, annular element 80, and shaft 63. It is therefore apparent that the annular molding cavity base element 80 is movable directly with the actuating shaft 63.

The lower annular element 88 is also vertically co-movable with actuating shaft 63, resting on top of a bearing sleeve 63a which is suitably secured to shaft 63 for co-movement. Sleeve 63a in turn is suitably journalled for vertical movements in the hollow stem portion 61c of mold housing 61.

The intermediate annular element 84 freely surrounds actuating shaft 63 and is supported and disposed in spaced relationship above lower annular element 88 by a plurality of peripherally spaced, heavy compression springs 84a. The top face of intermediate annular element 84 is spaced slightly below the bottom face of the mold base annular element 80 and abuts the lower face of a ring 80d that is peripherally secured to the mold base element 80 by bolts 30e and cooperates with an annular recess in the bottom face of mold base element 80 to define a cooling channel 80c therein.

The side walls of the molding cavity 100 (FIG. 6) are defined by a plurality of annular mold wall segments 66 which are mounted on an annular segment support wall 85. Support wall 85 is in turn supported in slightly spaced relationship above the intermediate annular element 84 by a plurality of peripherally disposed, relatively light compression springs 84c. Annular wall 85 has a radially enlarged portion 85a which slidably cooperates with the interior cylindrical wall 61d of the housing 61 and provides a radial shoulder abutting the stop shoulder 61g provided on the stop ring 61e.

It is therefore apparent that as the female mold assembly 62 is moved upwardly by actuating shaft 63, the segment supporting wall 85, hence segments 66, will be stopped by the interengagement of the enlarged portion 85a of such wall with the stop shoulder 61g.

The segment supporting wall 85 has a segment retaining ring 85b peripherally secured above its top surface by a plurality of bolts 85c. A plurality of spacer washers 85d maintains space between supporting wall 85 and segment retaining ring 85b to allow for sliding movement of segments 66. Radial slots 66b in segments 66 surround spacer washers 85d to allow radial movement of segments 66 without interference from spacer washers 85d. The inner periphery of ring 85b overlies the top surfaces of the segments 66 and holds such segments in assembly.

Annular mold wall segments 66 have vertically inclined bottom surfaces 66a engaged by inclined top surface 81a of a vertically shiftable actuating sleeve 81. Sleeve 81 is in turn secured by bolts 84b to intermediate annular element 84. Compression springs 66d urge segments 66 outwardly.

Upon further upward movement of the actuating shaft 63 after the segments 66 are stopped from further upward movement, a relative vertical displacement will be produced between the top cam surface 81a of the vertically shiftable molding wall element 81 and the inclined bottom surface 66a of the segment 60. This relative movement is opposed by compression springs 84c. The result of the relative movement is to cam the inner walls 66e of the segments 66 into snug engagement with the can body wall C over an annular area that is backed up by the ring 13 on the mandrel 10, and this engagement provides an upper limit to the flow of thermoplastic material around the exterior of the bottom portion C1 of the can side wall C during the completion of the compression molding operation.

The compression molding operation is completed by still further upward movement of actuating shaft 63 which, when the periphery of the intermediate annular element 84 engages the vertically locked bottom surface of the segment retaining wall 85 now effects the compression of the heavy compression springs 84a provided between the bottom annular element 88 and the intermediate annular element 84. Dowel pins 88b prevent relative reotation of annular elements 88 and 84. At the same time, the gob G of thermoplastic material disposed within the molding cavity 100 is now being compressed between the bottom face 12g of the mold base element 12 on mandrel 10 and the upper face 80a of the annular molding base element 80.

The rate of upward movement of the actuating shaft 63 is selected so as to produce a substantial compression force upon the gob G throughout the compression molding operation. Preferably, a compression molding force on the order of at least 200 to 500 pounds per square inch is exerted upon the thermoplastic material throughout all portions of the compression molding operation, but particularly, at the end of the compression molding operation when the thermoplastic material has been forced radially outwardly into intimate engagement with both sides of the can side wall portion C1 that projects into the molding cavity 100.

To provide the required vertical movements of the actuating shaft 63, shaft 63 is provided at its lower end with a depending roller 63b (FIG. 5) journalled on a diametrical pin 63c and engageable with the upper surface 64a of an annular cam track 64 which is rigidly secured to the bottom articulated frame elements 1a of the machine 1. Thus, the vertical position of the female mold mechanism relative to the successive mandrels 10 is determined by the configuration of the annular cam track 64a.

The limit to the upward movement of the female mold mechanism 62 is determined by the engagement of the top surface of the lower annular element 88 with the bottom surface of the intermediate annular element 84 which, as previously mentioned, is stopped in its upward travel by engagement with the segment retaining sidewall 85 which in turn is stopped by the stop ring 61e. Thus, a precise limit to the upward movement of the female molding mechanism 62 relative to the plunger 10 is provided, thereby assuring that the vertical dimensions of the molding cavity 100 will be precisely duplicated for each successive engagement of the mandrels 10 with the female molding mechanisms 62.

As will be apparent from FIG. 2, the mandrels 10 are not in overlying relationship with the molding element 60 around the entire periphery of the rotary compression molding turret 50. There is an arcuate space where the mandrels 10 are not overlying the molding elements 60 and this gap is utilized to effect the feeding of a gob G of molten thermoplastic material onto the top mold face 80a of each successive mold unit 60. As soon as the gob G has been deposited by the gob feeder F, (FIG. 1) the continued rotation of the mold table 52 brings the molding unit 60, with the gob G resting thereon, into vertical alignment with one of the overlying mandrels 10. The cam track 64a is designed to immediately thereafter raise the shaft 63, hence the molding mechanism 62, to its extreme upper position determined by the stop ring 61e and thus define the molding cavity 100 between the mold face 80a.

Molding mechanisms 62 are maintained in their raised molding positions by cam track 64a until it is assured that sufficient cooling of the compression molded plastic has been accomplished so that the plastic will maintain a self-supporting configuration. Such cooling may be expedited through the circulation of water or other cooling fluid through cooling passage 80c provided in the base element 80, connecting passages 63d provided in actuating shaft 63, and a conventional fluid connection provided by piping 65 to an appropriate source of cooling fluid. In any event, when the molded end wall E has been sufficiently cooled, the configuration of cam track 64a results in a lowering of the mold mechanism 62.

The initial lowering movement of the actuating shaft 63 produces an immediate downward displacement of the upper mold base annular element 80. It does not, however, result in a concurrent downward movement of the mold wall segments 66, because this would effect a stripping action on the thermoplastic material that has flowed into those portions into the molding cavity 100 which underlie the bottom portions of the segments 66. The segment supporting wall 85 carrying the segment 66 does not move downwardly until after the release of the compression forces on the springs 84c, and this is accomplished by the downward movement of the actuating sleeve 81 which occurs upon the release of the compression forces in the heavy compression springs 84a. Therefore, once the actuating 81 moves downwardly, the segments 66 are immediately expanded outwardly by the peripherally disposed compression springs 66d so that the subsequent downward movement of the segment supporting wall 85 does not result in the segments 66 dragging any portion of the thermoplastic material with them in their downward movement. Thus, the entire female molding mechanism 62 returns to the position shown in FIG. 5b wherein it is vertically spaced below the bottom portions of the plunger 10.

Hence at this point, the mandrel 10, carrying the can body wall C and the end wall E molded thereto, may be moved by the conveyor chain 20 from its position of vertical alignment with the mold unit 60 and proceed to enter the linear path 20c of the conveyor chain 20.

MANDREL DISASSEMBLING TABLE

It has been previously mentioned that the linear path 20c of the mandrel conveyor chain 20 between the compression molding turret 50 and the mandrel disassembling table 70 is primarily utilized for effecting further air cooling of the molded end wall unit E.

The chain links 21a and 21b of conveyor 20 respectively engage sprockets 71a and 71b (FIG. 8) which are in turn rigidly secured to a vertical shaft 71 which is suitably journalled for rotation in the articulated frame elements of the machine 1. As each mandrel 10 moves around the periphery of the disassembly table 70, the radial air passages 25c in guide bushing 25 of each mandrel 10 heretofore described are aligned with a passage 72a provided in an annular ring 72 secured to the under side of sprocket 71b. Passage 72a is connected to a source 76 of relatively high pressure air by piping 76a and this pressured fluid effects the downward stripping of the completed can body CE from the mandrel 10. The body CE is thus deposited on a rotary table 73 carried by shaft 71. Upstanding arcuate guides 74 are mounted above table 73 to prevent the inadvertent toppling of the completed can bodies CE.

The completed can bodies CE are then engaged by stationary guides 75 and moved by their own pressure against each other, produced by the forwarding movement of the rotary table 73, onto the output end of the conveyor 5, which then conveys the completed can bodies CE either to machines for performing further operations or to a packing machine. The empty mandrels 10 are then carried by the conveyor chain 20 back to the assembly table 30 where new can bodies C are applied to the mandrels and the operations heretofore described are repeated.

COMPRESSION MOLDING OF INDIVIDUAL PLASTIC ARTICLES

Those skilled in the art will recognize that the heretofore described machine may be conveniently modified to effect the compression molding of individual plastic articles without requiring the assembly of such articles to another article such as a can side wall. Referring particularly to FIGS. 11–14, wherein similar numerals refer to similar mechanisms heretofore described, it will be seen that it is only necessary to eliminate the can body feeding mechanism 30, and the mandrel loading mechanism 40 from the previously described machine and the end result is a machine that is capable of molding individual plastic articles as defined by the configuration of the mold cavity. Of course, these mechanisms can remain intact and no can bodies C be fed into the machine.

Figure 12:
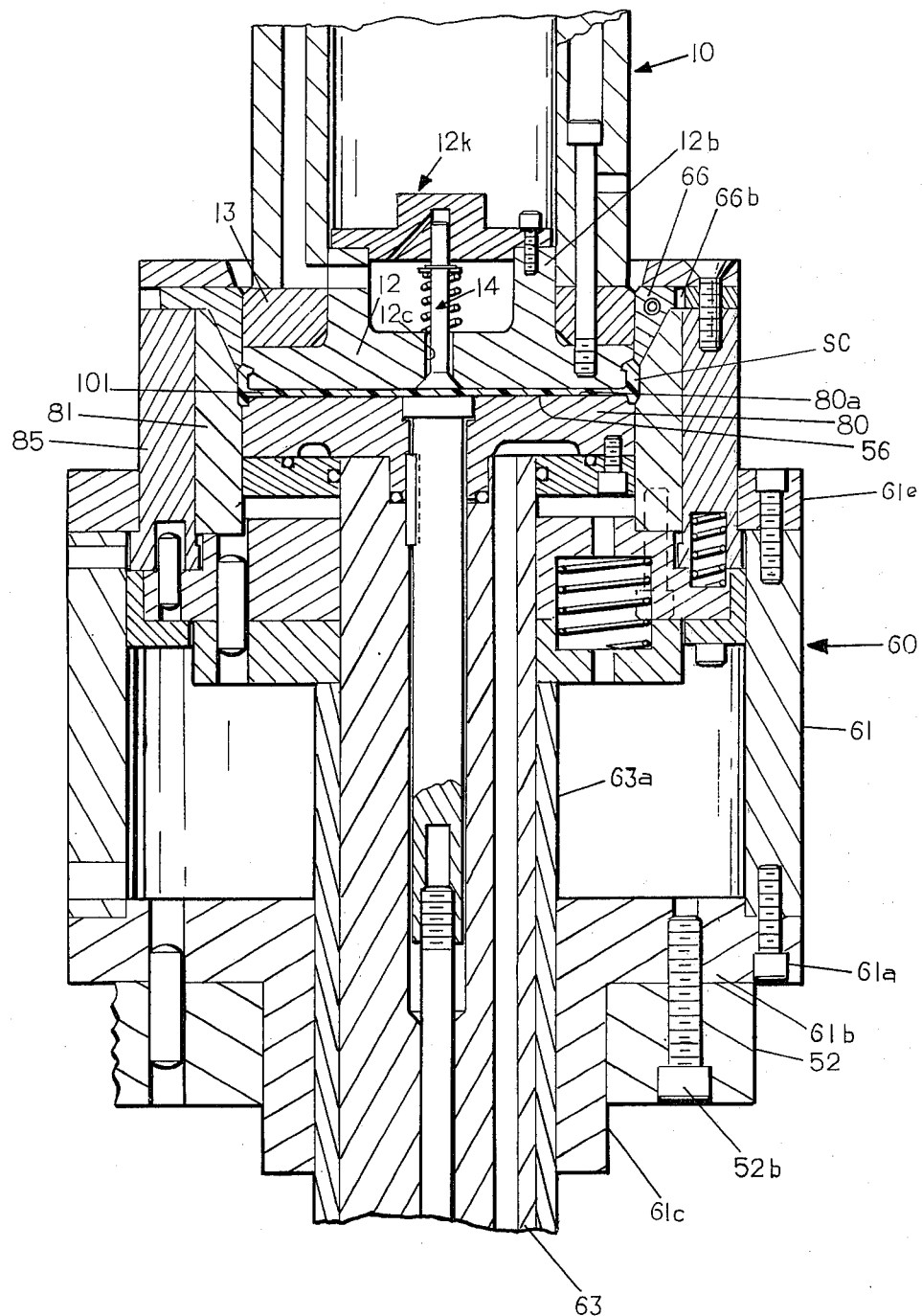
FIG. 12 is an enlarged scale, vertical sectional view taken on the plane 12—12 of FIG. 11.
Figure 13:
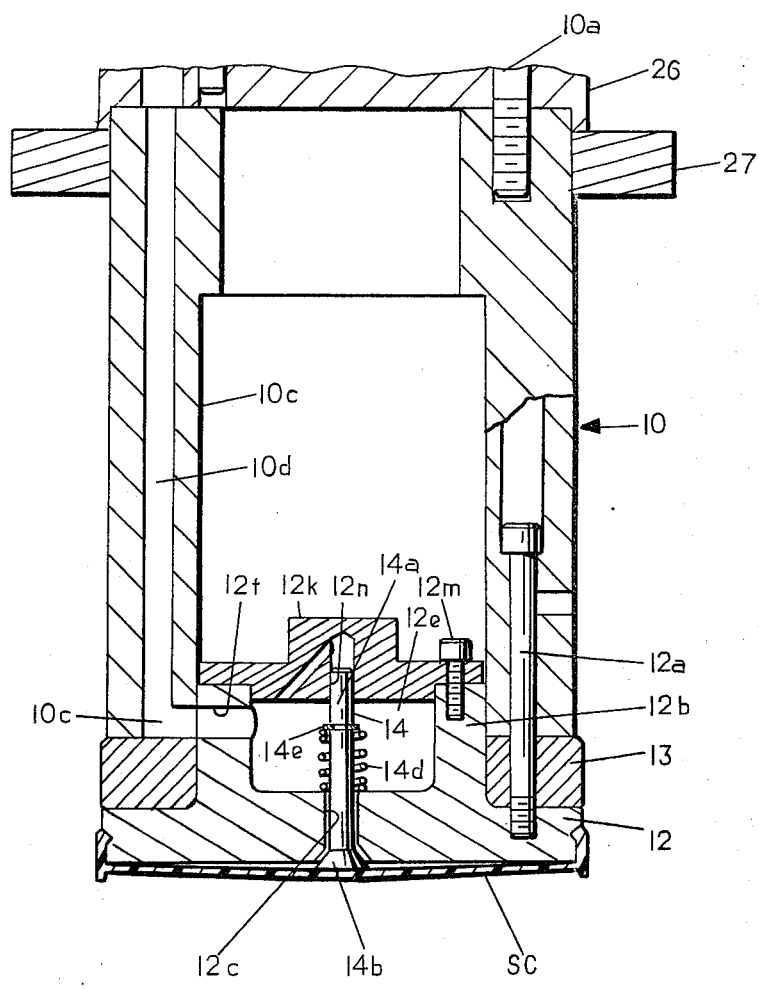
FIG. 13 is an enlarged scale, vertical sectional view taken on the plane 13—13 of FIG. 11.
Figure 14:
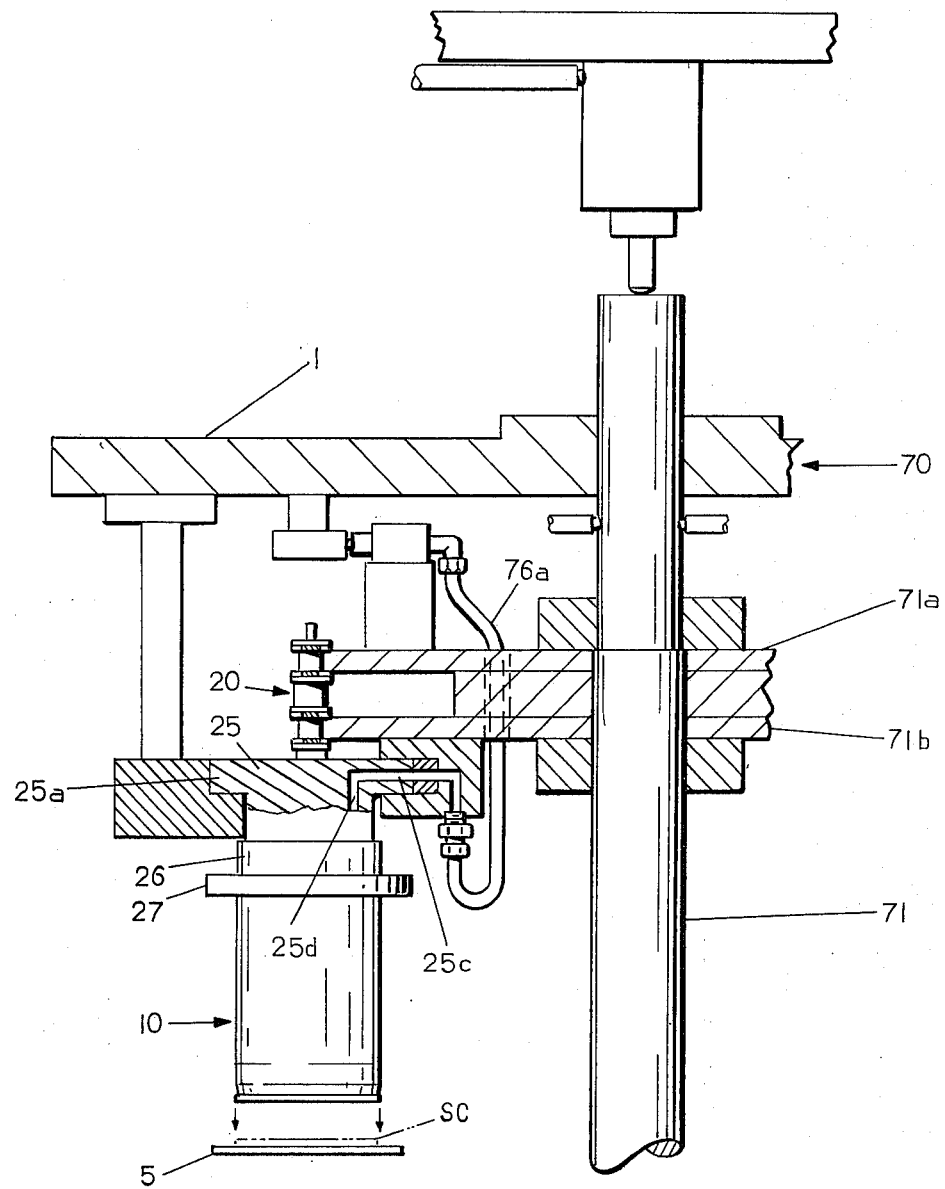
FIG. 14 is an enlarged scale vertical sectional view taken on the plane 14—14 of FIG. 11.

The machine shown in FIGS. 11–14 is designed solely to produce individual articles. Obviously, the mandrels 10 should now more properly be called plungers. The mold cavity 101 defined between the bottom end of each plunger 10 and the cooperating molding element 60 would, of course, be constructed to conform to the shape of the desired plastic article, here shown as a plastic snap cap SC. Otherwise, the operation of the machine would be the same except that the plungers 10 proceed from disassembly table 70 around a guide pulley 80 directly to the compression molding turret 50 without having any can body or similar article assembled thereto. As shown in FIG. 12, the desired article SC is compression molded from a gob of molten thermoplastic material at the compression molding turret 50, following which the mold elements 60 are dropped vertically with respect to the plungers 10 and the plungers 10 proceed to the unloading table 70 (FIG. 13) carrying the molded articles SC thereon. This presumes that the molding article is of such configuration that it would adhere to the plunger.

The molded particle SC is blown off plunger 10 at the unloading table 70 (FIG. 14) and deposited on the conveyor 5.

Further modifications of this invention will be readily apparent to those skilled in the art and it is intended that the scope of the invention be determined solely by the appended claims.

We claim:

1. In an apparatus for press forming organic thermoplastic material into molded parts having an extruder continuously producing a rodlike formation of hot moldable organic thermoplastic material and gob feeding means periodically engaging said formation to sever same into discrete gobs of substantially the same quantity of material, the improvement comprising:

(1) a plurality of mold members having exposed molding cavities;

(2) means for moving said mold members in timed relationship to said feeding means along a closed loop path intersecting the gravity path of said severed gobs, whereby each gob is deposited in a molding cavity;

(3) a plurality of molding plungers respectively cooperable with said mold members to close said molding cavity and compress the inserted gob into conformity with the closed cavity;

(4) means mounting said plungers for movement in timed relationship with said mold members along a closed loop path having a portion parallel and adjacent to the path of said mold members after receiving the severed gobs therein;

(5) means for relatively vertically displacing said plungers respectively into engagement with said mold members for a period of time sufficient to mold a respective inserted gob to conform to the closed molding cavity, and (6) means for successively separating the plungers and molding members for respectively removing the molded plastic articles.

2. In an apparatus for press forming organic thermoplastic material into molded parts having an extruder producing a continuous downwardly directed rod-like formation of hot moldable organic thermoplastic material and gob feeding means periodically engaging said formation to sever same into discrete gobs of substantially the same volume of material, the improvement comprising:

(1) a plurality of mold members having upwardly open molding cavities;

(2) means for horizontally moving said mold members in timed relationship to the movement of said gob feeding means along a closed loop path intersecting the gravity fall path of said severed gobs, whereby each gob is deposited in one of said molding cavities;

(3) a plurality of molding plungers respectively cooperable with said mold members to close said molding cavity and compress an inserted gob into conformity with the closed cavity;

(4) means mounting said plungers for horizontal movement in timed relationship with said mold members along a closed loop path having a portion thereof disposed parallel and above the path of said mold members after receiving the severed gobs therein;

(5) means for vertically displacing said mold members upwardly respectively into engagement with said plungers for a period of time sufficient to mold the respective inserted gobs to conform to the closed molding cavity, and (6) means for respectively removing the molded plastic articles at one region in the path of travel of the plungers.

3. Apparatus of claim 1 wherein said molding cavities define a can end member.

4. Apparatus of claim 3 plus means for loading an open end can body on each said plunger at a point in its path prior to the said path portion that is parallel and adjacent to the path of said mold members, the open end of said can body projecting into the said molding cavity, whereby a can end is molded from said gob onto said open end of each can body.

5. Apparatus of claim 4 wherein said means for respectively removing the molded article comprises a fluid passage in the end face of said plunger, a check valve closing said passage to entry of gob material, and means for supplying pressurized air to said passage after separation of each said plunger from the respective molding member to blow the assembled can body and end off the plunger.

6. Apparatus of claim 1 or 4 wherein each molding member includes a peripheral array of annular segments radially shiftable between an inner molding position adjacent to the respective plunger and an outer mold open position, and means for shifting said segments to said molding position prior to completion of the vertical engagement movement of said plunger and mold member, said last mentioned means being also effective to move said segments radially outwardly prior to any vertical movement of the segments away from said molding position.

7. Apparatus of claim 1 or 4 wherein said means for relatively vertically displacing said plungers and mold members comprises a vertical shaft journalled for axial movements, a cam track engagable by the shaft to control its vertical position, a circular element carried by the top portions of said shaft, said circular element defining a bottom surface of said molding cavity, a plurality of annular segments mounted on said circular element for radial movement, said segments being in peripherally abutting relationship in their radially inward position to define a peripheral wall of said molding cavity, and an annular cam mounted on said shaft for vertical movements relative thereto, said annular cam being engagable with said annular segments to shift same to said radially inward molding position prior to said circular element moving to its molding position relative to said plunger.

8. Apparatus for molding a thermoplastic can end into assembled relationship with a preformed can body comprising, in combination:

(1) means for periodically producing gobs of hot moldable thermoplastic material;

(2) a plurality of mold members having exposed molding cavities;

(3) means for moving said mold members along a closed loop horizontal path;

(4) means for transferring said gobs successively into said molding cavities;

(5) a plurality of mandrels mounted for movement in vertical alignment with the mold member (6) means for mounting a can body on each mandrel prior to such mandrel moving into alignment with a mold member;

(7) means for relatively vertically moving each said mandrel into engagement with a mold member to define a molding cavity therebetween corresponding to the configuration of a desired can end, with the end portion of said can body projecting into said molding cavity, whereby said thermoplastic gob is displaced throughout said molding cavity by compression molding;

(8) means for relatively vertically separating said mandrels and said mold members leaving the can bodies on the respective mandrels, and (9) means for successively removing the can bodies with the thermoplastic ends assembled thereon from said mandrels.

9. The apparatus defined in claim 8 wherein the means for applying said can bodies to said mandrels comprises a rotary table, means of successively feeding can bodies into pockets spaced around the perimeter of said rotary table, means for directing the mandrels in a path overlying the path of the can bodies on said rotary table, and means for vertically shifting said can bodies upwardly from said rotary table into surrounding relationship with the mandrels.

10. Apparatus of claim 1, 4 or 8 wherein the top rim portions of said mold members comprise a plurality of annular segments, plus means for radially shifting said segments into engagement with said respective plunger.

11. Apparatus of claim 8 wherein each molding member includes a peripheral array of annular segments radially shiftable between an inner molding position adjacent to the respective plunger and an outer mold open position, and means for shifting said segments to said molding position prior to completion of the vertical engagement movement of said plunger and mold member, said last mentioned means being effective to move said segments radially outwardly prior to any vertical movement away from said molding position.

12. Apparatus of claim 8 wherein said means for relatively vertically moving said plungers and mold members comprises a vertical shaft journalled for axial movements, a cam track engagable by the shaft to control its vertical position, a circular element carried by the top portions of said shaft, said circular element defining a bottom surface of said molding cavity, a plurality of annular segments mounted on said circular element for radial movement, said segments being in peripherally abutting relationship in their radially inward position to define a peripheral wall of said molding cavity, and an annular cam mounted on said shaft for vertical movements relative thereto, said annular cam being engagable with said annular segments to shift same to said radially inward molding position prior to said circular element moving to its molding position relative to said plunger.

* * * * *